United States Patent [19]

Shiga et al.

[11] Patent Number: 4,514,512

[45] Date of Patent: Apr. 30, 1985

[54] METHOD FOR THE PRODUCTION OF SOLID TITANIUM TRICHLORIDE CATALYST

[75] Inventors: Akinobu Shiga, Ehime; Yukio Naito, Chiba; Toshio Sasaki; Junpei Kojima, both of Ehime; Hiroshi Yoshioka, Saitama; Akira Nunose, Ehime, all of Japan

[73] Assignee: Sumitomo Chemical Company, Limited, Japan

[21] Appl. No.: 480,648

[22] Filed: Mar. 31, 1983

[30] Foreign Application Priority Data

Feb. 19, 1982 [JP] Japan .................. 57-26508

[51] Int. Cl.$^3$ .............................. C08F 4/64
[52] U.S. Cl. .................. 502/107; 502/104; 502/112; 502/119; 526/137
[58] Field of Search ............ 502/104, 107, 112, 119

[56] References Cited

U.S. PATENT DOCUMENTS 4,165,298  8/1979  Shiga et al. .................. 502/104 X

FOREIGN PATENT DOCUMENTS 56-116706  9/1981  Japan .

*Primary Examiner*—Patrick Garvin

*Attorney, Agent, or Firm*—Sughrue, Mion, Zinn, Macpeak and Seas

[57] ABSTRACT

A method for the production of a solid titanium trichloride catalyst by the steps of preparing a titanium trichloride composition comprising a solid reduction product obtained by reducing titanium tetrachloride with an organoaluminum compound represented by the formula, $R^1{}_n AlY_{3-n}$ (wherein $R^1$ is a hydrocarbon group having 1 to 18 carbon atoms; Y is a halogen atom or a hydrogen atom; and n is a number satisfying the equation, $1 < n \leq 3$), or a solid product obtained by thermally treating said solid reduction product at a temperature of not more than 150° C.; reacting said titanium trichloride composition in an aromatic hydrocarbon solvent with a mixture consisting of a halogen compound represented by the formula, $X_2$ (wherein X is Cl, Br, or I), or an interhalogen compound represented by the formula, $XX'_a$ (wherein X and X' are each Cl, Br, or I, and a is 1 or 3), and an ether compound represented by the formula, $R^2$—O—$R^3$ (wherein $R^2$ and $R^3$, which may be the same or different, are each an alkyl group having 1 to 10 carbon atoms); subjecting the resulting reaction mixture to solid-liquid separation; and washing the resulting solid product with an inert hydrocarbon solvent, which method is characterized by using an aliphatic hydrocarbon as a washing medium during at least the first of washing treatments performed subsequently to said solid-liquid separation of said reaction mixture.

10 Claims, No Drawings

METHOD FOR THE PRODUCTION OF SOLID TITANIUM TRICHLORIDE CATALYST

FIELD OF THE INVENTION

This invention relates to a method for the production of a solid titanium trichloride catalyst.

BACKGROUND OF THE INVENTION

Heretofore, a catalyst system comprising titanium trichloride and an organoaluminum compound has been used in the commercial production of a highly crystalline polymer of an α-olefin such as propylene or butene-1.

Since the polymerization in this production proceeds in a form having solid titanium trichloride embraced in the polymer being formed, titanium trichloride remains in the resulting polymer. This residual titanium trichloride adversely affects such properties of the polymer as hue and thermal stability and hence, the polymer generally has been required to undergo a treatment capable of removing the polymer of the residual titanium trichloride through extraction. Besides, the polymerization forms as a by-product an amorphous polymer called an atactic polymer. When this atactic polymer is suffered to mingle into the produced polymer, it degrades the mechanical properties of the polymer or imparts viscidity to the polymer. In this respect, the polymer has been required to be given a treatment capable of removing the atactic polymer by washing.

The necessity for such extra treatments has entailed an economic disadvantage in terms of natural resources and energy. Thus, simplification of the conventional polymerization has been earnestly in demand. Various improvements have been given to date to the method for the production of titanium trichloride. Consequently, the recent products of this method exhibit notably improved polymerization activity and/or stereoregularity. Thus, a polymerization process which obviates the necessity for the aforementioned extra treatments has become commercially feasible. As one version of the method for the production of titanium trichloride, some of the present inventors formerly proposed a method disclosed in Japanese Patent Publication No. 27085/80. As an improvement over this version, they also proposed a method disclosed in Japanese Patent Application (OPI) No. 116706/81 (the term "OPI" as used herein refers to a "published unexamined Japanese patent application").

When a solid product obtained by reducing titanium tetrachloride with an organoaluminum compound or a product obtained by thermally treating the aforementioned solid reduction product is used as a titanium trichloride composition, and the composition is reacted with a halogen compound and an ether compound or with a halogen compound, an ether compound and an electron donor in any of the methods disclosed in Japanese Patent Publication No. 27085/80 and Japanese Patent Application (OPI) No. 116706/81, then the reaction product will experience great difficulty in passing through a filter during the course of the subsequent washing treatment. By this reason, the separation of the reaction product has had to rely on a decantation process which suffers from poor solid-liquid efficiency. When the reaction product is further dried subsequently to the washing treatment, tough masses occur in a fairly large volume. If these tough masses are directly put to use in the polymerization of an α-olefin, they may possibly clog the feed line for solid catalyst or they may give rise to solid polymers within the polymerization vessel and eventually entail the trouble of clogging the valve used for the discharge of the produced polymer. Thus, the dried reaction product containing such tough masses has had to be sifted for removal of such tough masses. These problems have been prominent during the working of the method disclosed in Japanese Patent Application (OPI) No. 116706/81.

As the result of extensive studies, the present inventors have found that in the methods disclosed in Japanese Patent Publication No. 27085/80 and Japanese Patent Application (OPI) No. 116706/81 comprising the steps of reacting a titanium trichloride composition with a halogen compound and an ether compound and, if desired, an electron donor in an aromatic hydrocarbon solvent, subjecting the reaction product to solid-liquid separation and then washing the separated solid product, the aforementioned problems can be solved by using an aliphatic hydrocarbon in at least the first of washing treatments so performed on the solid product mentioned above. This invention has issued from this knowledge.

SUMMARY OF THE INVENTION

An object of this invention is to provide a method for the production of a solid titanium trichloride catalyst by the steps of preparing a titanium trichloride composition comprising a solid reduction product obtained by reducing titanium tetrachloride with an organoaluminum compound represented by the formula, $R^1_n AlY_{3-n}$ (wherein $R^1$ is a hydrocarbon group having 1 to 18 carbon atoms; Y is a halogen atom or a hydrogen atom; and n is a number satisfying the equation, $1 < n \leq 3$), or a solid product obtained by thermally treating the solid reduction product as obtained above at a temperature of not more than 150° C.; reacting the titanium trichloride composition in an aromatic hydrocarbon solvent with a mixture consisting of a halogen compound represented by the formula, $X_2$ (wherein X is Cl, Br, or I), or an interhalogen compound represented by the formula, $XX'_a$ (wherein X and X' are each Cl, Br, or I, and a is 1 or 3), and an ether compound represented by the formula, $R^2—O—R^3$ (wherein $R^2$ and $R^3$, which may be the same or different, are each an alkyl group having 1 to 10 carbon atoms); subjecting the reaction mixture to solid-liquid separation; and washing the resulting solid product with an inert hydrocarbon solvent, which method is characterized by using an aliphatic hydrocarbon as a washing medium during at least the first of washing treatments performed subsequently to the solid-liquid separation of reaction mixture.

DETAILED DESCRIPTION OF THE INVENTION

The organoaluminum compound used in the reduction of titanium tetrachloride is a compound represented by the formula, $R^1_n AlY_{3-n}$, wherein $R^1$ is a hydrocarbon group having 1 to 18 carbon atoms, preferably a straight or branched alkyl group having 1 to 8 carbon atoms, more preferably a straight or branched alkyl group having 2 to 4 carbon atoms; Y is a halogen atom or a hydrogen atom, preferably Cl, Br, or I, more preferably Cl; and n is a number satisfying the equation, $1 < n \leq 3$, preferably $1 < n \leq 2$. Specific examples of the organoaluminum compound include methyl aluminum sesquichloride, ethyl aluminum sesquichloride, isobutyl aluminum sesquichloride, dimethyl aluminum chloride, diethyl aluminum chloride, diethyl aluminum bromide, diethyl aluminum iodide, di-n-propyl aluminum chloride, di-n-butyl aluminum chloride, diisobutyl aluminum chloride, diethyl aluminum hydride, diisobutyl aluminum hydride, trimethyl aluminum, triethyl aluminum, tri-n-propyl aluminum, tri-n-butyl aluminum, triisobutyl aluminum, tri-n-hexyl aluminum, tri(2-methylpentyl)aluminum, and tri-n-octyl aluminum. Of these compounds, diethyl aluminum chloride, ethyl aluminum sesquichloride, a mixture thereof, and a mixture of ethyl aluminum sesquichloride with ethyl aluminum dichloride, especially ethyl aluminum sesquichloride, bring about particularly desirable results.

The reduction reaction for obtaining the solid reduction product is preferably carried out in an inert hydrocarbon solvent, preferably an aliphatic hydrocarbon solvent such as hexane or heptane, at a temperature between $-50°$ C. and $50°$ C., preferably between $-30°$ C. and $30°$ C. Specifically, this reduction reaction is preferably carried out by gradually adding an inert hydrocarbon solution of the organoaluminum compound to an inert hydrocarbon solution of titanium tetrachloride such that the temperature of the reaction system can be maintained at a prescribed temperature. The concentrations of titanium tetrachloride and the organoaluminum compound in their respective inert hydrocarbon solutions are each preferably in the range of 20 to 80% by weight, preferably 30 to 60% by weight. The reaction ratio between titanium tetrachloride and the organoaluminum compound represented by the formula, $R^1{}_n AlY_{3-n}$, is preferably $n^{-1}$ to $2\times(n-1)^{-1}$ mol, preferably $1\times(n-1)^{-1}$ to $1.5\times(n-1)^{-1}$ mol, of the organoaluminum compound per mol of titanium tetrachloride (providing that the mol number of the organoaluminum compound is calculated as a monomer). The reduction reaction is preferably carried out with stirring to a suitable extent. After mixing titanium tetrachloride with the organoaluminum compound, the reaction system is preferably further stirred for 15 minutes to 6 hours at a temperature falling within the aforementioned reaction temperature range to thereby complete the reduction reaction. Thus is obtained a suspension of the solid reduction product.

The solid reduction product is preferably subjected to a thermal treatment at a temperature of not more than $150°$ C. This thermal treatment may be performed after the suspension of solid reduction product formed by the reduction reaction has been subjected to solid-liquid separation and washed with an inert hydrocarbon solvent. Preferably, the thermal treatment is carried out on the suspension of solid reduction product in its unaltered form. This thermal treatment can be effected by heating the suspension of solid reduction product at a temperature of not more than $150°$ C., preferably at a temperature between $50°$ and $120°$ C. The time of the thermal treatment is generally from 0.5 to 6 hours, although it is not particularly limited.

The suspension which has undergone the thermal treatment is preferably subjected to solid-liquid separation and then washed several times with an inert hydrocarbon solvent such as hexane, heptane, cyclohexane, methyl cyclohexane, toluene, or xylene. Thus is obtained the thermally treated solid product.

The titanium trichloride composition comprising either the solid reduction product or the thermally treated solid product is then reacted with a mixture consisting of a halogen or interhalogen compound and an ether compound.

The halogen compound used is represented by the formula, $X_2$, wherein X is Cl, Br, or I, preferably I.

The interhalogen compound used is represented by the formula, $XX'_a$, wherein X and X' are each Cl, Br, or I, and a is 1 or 3. Specific examples of the interhalogen compound include bromine chloride, iodine chloride, iodine trichloride, and iodine bromide. The interhalogen compound is preferably an iodine-containing interhalogen compound, especially iodine trichloride.

The amount of the halogen or interhalogen compound used is preferably in the range of from $10^{-5}$ to $5\times 10^{-2}$ mol, preferably from $10^{-4}$ to $10^{-2}$ mol, per gram of the titanium trichloride composition.

The halogen or interhalogen compound is preferably used as dissolved in an aromatic hydrocarbon solvent and/or an ether compound.

Suitable examples of the ether compound represented by the formula, $R^2$—O—$R^3$ (wherein $R^2$ and $R^3$, which may be the same or different, are each an alkyl group having 1 to 10 carbon atoms) include diethyl ether, di-n-propyl ether, diisopropyl ether, di-n-butyl ether, di-n-amyl ether, diisoamyl ether, di-neopentyl ether, di-n-hexyl ether, di-n-octyl ether, methyl n-butyl ether, methyl isoamyl ether, and ethyl isobutyl ether, with the di-n-butyl ether and diisoamyl ether being preferred. The amount of the ether compound used is $10^{-4}$ to 0.03 mol, preferably $10^{-3}$ to 0.02 mol, more preferably 0.002 to 0.01 mol, per gram of the titanium trichloride composition.

The reaction of the titanium trichloride composition with the mixture of the halogen or interhalogen compound with the ether compound is carried out in an aromatic hydrocarbon solvent such as toluene or xylene. The concentration of the titanium trichloride composition in the aromatic hydrocarbon solvent is in the range of from 50 to 500 g/liter, preferably from 100 to 300 g/liter.

The reaction temperature is in the range of from $20°$ to $150°$ C., preferably from $50°$ to $120°$ C. The reaction is preferably carried out while stirring the suspension of titanium trichloride composition. The reaction time is in the range of 5 minutes to 6 hours, perferably from 15 minutes to 2 hours.

Specifically, the reaction can be effected by, for example, a method which comprises heating the suspension of titanium trichloride composition in an aromatic hydrocarbon to a prescribed temperature and adding the mixture of the halogen or interhalogen compound with the ether compound to the heated suspension, or a method which comprises adding to the heated suspension a solution of the halogen or interhalogen compound in an aromatic hydrocarbon solvent and the ether compound separately.

In the reaction with the titanium trichloride compound, the halogen or interhalogen compound and the ether compound represented by the formula, $R^2$—O—$R^3$ (wherein $R^2$ and $R^3$, which may be the same or different, are each an alkyl group of 1 to 10 carbon atoms), may be accompanied by other electron donor.

The electron donor which can be used is selected from the group consisting of nitrogen-, oxygen-, sulfur- and phosphorus-containing organic compounds.

Typical examples of the electron donor include ethers such as aromatic ethers (e.g., diphenyl ether and anisole); siloxanes such as dimethyl polysiloxane; thioethers such as butyl sulfide; amines such as tertiary amines (e.g., trioctylamine); and phosphoric acid esters such as butyl phosphate.

The amount of the electron donor used is in the range of from $1 \times 10^{-4}$ to $1 \times 10^{-2}$ mol, preferably from $2 \times 10^{-4}$ to $1 \times 10^{-3}$ mol, per gram of titanium trichloride.

A characteristic feature of the invention resides in that in the procedure comprising reacting a titanium trichloride composition in an aromatic hydrocarbon solvent with a mixture consisting of a halogen or interhalogen compound and an ether compound (and, if desired, an electron donor), subjecting the reaction mixture to solid-liquid separation and subsequently washing the separated solid reaction product, an aliphatic hydrocarbon is used as a washing medium in at least the first of washing treatments involved.

When the solid reaction product resulting from the solid-liquid separation is washed with an aromatic hydrocarbon solvent like toluene as indicated in all the working examples in Japanese Patent Publication No. 27085/80 and Japanese Patent Application (OPI) No. 116706/81, the separation of the washed solid product by use of a filter is difficult as to make inevitable the adoption of the technique of decantation which provides washing with poor efficiency. But, such filtration can be carried out very smoothly in accordance with the method of this invention. As is well known, effective use of the technique of decantation requires a given suspension of solid particles in a liquid to be left standing until the solid particles are thoroughly settled. Thus, this technique calls for much longer time in the washing than the technique of filtration which proceeds smoothly.

As is also well known, the technique of filtration has a salient economic advantage that the amount of washing medium used and the number of washings made are both small because it enjoys a decisively higher washing efficiency than the technique of decantation.

When the solid reaction product is washed and subsequently dried as in all the working examples in Japanese Patent Publication No. 27085/80 and Japanese Patent Application (OPI) No. 116706/81, there consequently occur a fairly large volume of solid masses several times as large in diameter as the original solid particles of an average diameter. These solid masses are amorphous and tough. When the solid product containing these solid masses is put to use in its unaltered form in the polymerization of an olefin, there are produced solid masses of polymer in a fairly large volume.

For use in a polymerization apparatus of commercial scale, since the solid catalyst containing such solid masses has possibilities that the catalyst itself will clog the catalyst feed line and that the solid masses of polymer will clog the valve for discharge of the produced polymer from the polymerization vessel, the solid catalyst must be freed from such solid masses before it is fed into the polymerization apparatus. Thus, the polymerization apparatus is required to be provided with extra sieving means capable of removing such solid masses. Since the solid masses account for a fairly large proportion of the solid catalyst, the operation of the sieving consumes much time. Besides, no small proportion of the solid titanium trichloride catalyst is wasted in the form of solid masses which are destined to be removed and discarded as useless debris. In accordance with the method of this invention, solid masses of any form are not produced at all or produced only sparingly, however.

The cause for this advantageous effect brought about by the method of this invention has not yet been fully elucidated. Only the existing evidence admits of an inference that this method has some distinct effect upon the interaction between the liquid component of the reaction mixture surviving the solid-liquid separation and the washing medium.

The solid-liquid separation of the reaction mixture is required such that the liquid component suffered to remain in the separated solid product may be as small as possible. Thus, use of the technique of filtration proves to be desirable for the purpose of solid-liquid separation. The filtration performed under application of pressure of the order of several $kg/cm^2G$ enables the solid-liquid separation to be carried out to an extent that the liquid component suffered to remain in the solid component is decreased to an amount of several tens of % based on the weight of the solid component. If the pressure applied for the filtration is lowered to about 0.2 $kg/cm^2G$, then the weight of the liquid component suffered to remain in the solid product is substantially equal to that of the solid product.

In at least the first of washing treatments which are performed subsequently to the solid-liquid separation, an aliphatic hydrocarbon is used as a washing medium. Specific examples of the aliphatic hydrocarbon include n-hexane, n-heptane, n-octane, isooctane, and n-decane. The aliphatic hydrocarbon used may be of industrial grade so far as its aromatic hydrocarbon content is small. The slurry of the aliphatic hydrocarbon is stirred for several minutes to several tens of minutes before it is subjected to solid-liquid separation. Again in this case, the technique of filtration is preferably used for this separation as in the solid-liquid separation of the reaction mixture. The ratio of the liquid component suffered to remain in the separated solid component is about the same as in the previous solid-liquid separation.

The solid product thus washed is desired to be given several more washing treatments. The washing medium used in the second and following washing treatments may be an aromatic hydrocarbon solvent or an aliphatic hydrocarbon solvent. With a view to the ease of drying, however, the washing medium used in the last washing treatment is preferably a low-boiling solvent such as n-hexane.

The amount of the washing medium used in one washing treatment is in the range of from 1.5 to 50 ml, preferably from 2.0 to 20 ml, based on gram of the solid titanium trichloride catalyst.

The washing temperature is in the range of from 0° to 70° C., preferably from 5° to 50° C.

Thus, the solid titanium trichloride catalyst of this invention is obtained.

The solid titanium trichloride catalyst of this invention enables an α-olefin to be polymerized with high stereo-regularity in high yield by using an organoaluminum compound as an activating agent. Specific examples of the organoaluminum compound used as the activating agent include trialkyl aluminums, dialkyl aluminum hydrides, and dialkyl aluminum halides. Particularly desirable are diethyl aluminum chloride and a mixture thereof with triethyl aluminum.

The aforementioned catalyst system may be used in a form additionally incorporating therein a known Lewis base. Typical examples of the Lewis base include esters such as methyl methacrylate, ethyl benzoate, γ-butyrolactone, and ε-caprolactone, and phosphorous esters such as triphenyl phosphite and tri-n-butyl phosphite.

The polymerization is generally performed at a temperature in the range of from 0° to 100° C. under a pressure in the range of from atmospheric pressure to 100 atmospheres. The polymerization can be carried out either continuously or batchwise.

The α-olefins for which the solid titanium trichloride catalyst of this invention functions particularly advantageously are those of 2 to 10 carbon atoms, with propylene being preferred. Besides, the solid catalyst of this invention can be advantageously used in the random copolymerization or hetero-block copolymerization of propylene with ethylene and/or other olefin such as butene-1. It is also usable in the slurry polymerization using a liquid monomer as a polymerization medium or in the gaseous-phase polymerization using a gaseous monomer.

Now, the method of this invention is described specifically below with reference to the following examples, which are not limitative of this invention in any way.

EXAMPLE 1

A. Preparation of titanium trichloride composition:

A 200 ml four-neck flask having provided with a stirrer and a dropping funnel was purged with argon, charged with 48 ml of n-heptane and 12 ml of titanium tetrachloride, and then cooled to keep the solution therein at −10° C. With the inner temperature of the flask kept in a range of from −5° to −10° C., a solution consisting of 61 ml of n-heptane and 25 ml of ethyl aluminum sesquichloride was gradually added dropwise to the flask through the dropping funnel over a period of 3 hours.

After completion of the dropwise addition, the solution was stirred at −10° C. for 30 minutes, then heated to 75° C. over a period of 1 hour, and further stirred for 2 hours. Subsequently, the solution was left standing at 25° C. and passed through a glass filter, G-3, for solid-liquid separation. The solid product thus separated was washed 4 times with 100 ml of n-heptane and then dried in vacuo to obtain a titanium trichloride composition.

B. Preparation of solid titanium trichloride catalyst:

B-1. Reaction of titanium trichloride composition:

A 100 ml flask provided with a stirrer was purged with argon, charged with 11.6 g of the aforementioned titanium trichloride composition and 31.2 ml of toluene, and heated to keep the flask interior at 70° C. To the flask were added successively a solution of 1.32 g of iodine dissolved in 26.6 ml of toluene, 12.7 ml of di-n-butyl ether and 1.1 ml of tri-n-octylamine. The resulting mixture was heated to 95° C. and allowed to react at the same temperature for 1 hour.

B-2. Washing:

After completion of the reaction, the reaction mixture was left standing at 25° C. and then passed through a glass filter, G-3, under an argon pressure of about 0.2 kg/cm$^2$. Then, the separated solid product was washed with 20 ml of n-heptane. The washings were filtered under the same conditions as those involved in the filtration of the reaction mixture. Complete filtration of the washings was obtained in a matter of about 1 minute. This operation was repeated 6 times. The solid component separated was dried in vacuo to obtain a solid titanium trichloride catalyst. The solid titanium trichloride catalyst thus obtained was not found to contain any solid mass.

C. Polymerization of propylene:

A 0.1 l stainless steel-made autoclave provided with a magnetic stirrer for agitation of its contents was purged with argon and charged with 240 mg of diethyl aluminum chloride, 14.8 mg of the aforementioned solid titanium trichloride catalyst, and 80 ml of liquefied propylene.

The autoclave was kept at 60° C. for 1 hour with stirring. Excess propylene was released from the autoclave, and the resulting polypropylene was air dried overnight. Consequently, there was obtained 18.2 g of polypropylene.

These results indicate that the yield of polypropylene (gram) per gram of the solid titanium trichloride catalyst (hereinafter referred to as "PP/cat" for short) was PP/cat=1,230.

In the produced polypropylene powder, solid masses of polymer having diameters exceeding 1,000μ were contained in a ratio of only 1.8 wt%.

COMPARATIVE EXAMPLE 1

A. Preparation of solid titanium trichloride catalyst:

In the preparation of a solid titanium trichloride catalyst according to Step B of Example 1, the reaction of a titanium trichloride composition was carried out by following the procedure of Sub-Step B-1. The resulting reaction mixture was left standing at 25° C. and then passed through a glass filter, G-3, having an available filter area of 3.0 cm$^2$ under an argon pressure of about 0.2 kg/cm$^2$.

Then, the solid reaction product separated by the filtration was washed with 20 ml of toluene. When the resulting washings were subjected to filtration under the same conditions as those involved in the filtration of the reaction mixture, the filtration proceeded at a very slow speed. Thus, the argon pressure was increased to 0.5 kg/cm$^2$ for the purpose of expediting the filtration. As the result, complete filtration of the washings was barely in about 5 minutes.

The solid reaction product was once again washed with 20 ml of toluene. When an attempt was made to pass the resulting washings through the glass filter, virtually no filtration was obtained. As an alternative measure, the slurry was left standing until the solid catalyst settled and then subjected to solid-liquid separation under application of argon pressure with the aid of a stainless steel pipe 2 mm in inside diameter. The slurry was washed by being subjected to solid-liquid separation by the use of this stainless steel pipe once with 20 ml of toluene and twice with 20 ml of n-heptane. The washed slurry was dried in vacuo to obtain a solid titanium trichloride catalyst. In the solid titanium trichloride catalyst thus obtained, a fairly large amount of solid masses were found.

B. Polymerization of propylene:

When propylene was polymerized in the presence of the catalyst mentioned above by following the procedure of Step C of Example 1, the yield of the polymerization, PP/cat, was 1,330.

In the produced polypropylene powder, solid masses having diameters exceeding 1,000μ were present in a total ratio of 24.4 wt%. In these solid masses, those having diameters exceeding 3 mm accounted for a fairly large proportion.

EXAMPLE 2

A. Preparation of solid titanium trichloride catalyst:

In the preparation of a solid titanium trichloride catalyst according to Step B of Example 1, the reaction of a titanium trichloride composition was carried out by following the procedure of Sub-Step B-1. The resulting reaction mixture was left standing at 25° C. and then passed through a glass filter, G-3, having an available filter area of 3.0 cm$^2$ under an argon pressure of about 0.2 kg/cm$^2$.

Then, the solid reaction product thus separated was washed twice with the glass filter, G-3, using 20 ml of n-heptane. It was further washed twice with 20 ml of toluene and twice with 20 ml of n-heptane. The resulting washings were invariably passed smoothly through the filter.

After the washing, the solid product was dried in vacuo to obtain a solid titanium trichloride catalyst. In the solid titanium trichloride catalyst thus obtained, no discernible solid mass was found.

B. Polymerization of propylene:

When propylene was polymerized in the presence of the catalyst mentioned above by following the procedure of Step C of Example 1, the yield of the polymerization, PP/cat, was 1,360.

In the produced polypropylene powder, solid masses having diameters exceeding 1,000μ were present in a total ratio of only 4.5 wt%.

EXAMPLE 3

A. Preparation of titanium trichloride composition:

A 200 ml four-neck flask provided with a stirrer and a dropping funnel was purged with argon, charged with 48 ml of n-heptane and 12 ml of titanium tetrachloride, and cooled to keep the solution inside at −10° C. With the internal temperature of the flask kept in a range of from −5° to −10° C., a solution consisting of 61 ml of n-heptane and 25 ml of ethyl aluminum sesquichloride was gradually added dropwise into the flask through the dropping funnel over a period of 3 hours.

After completion of the dropwise addition, the internal temperature of the flask was elevated to 25° C. over a period of 30 minutes. At this temperature, the mixture in the flask was stirred for 30 minutes. Subsequently, the internal temperature of the flask was elevated to 75° C. over a period of 30 mintues at which the mixture was stirred further for 2 hours. Then, the reaction mixture was left standing at 25° C. and passed through a glass filter, G-3, for solid-liquid separation. The solid product thus separated was washed 4 times with 100 ml of n-heptane and dried in vacuo to obtain a titanium trichloride composition.

B. Preparation of solid titanium trichloride catalyst:

B-1. Reaction of titanium trichloride composition:

A 200 ml flask provided with a stirrer was purged with argon, charged with 18.1 g of the aforementioned titanium trichloride composition and 49 ml of toluene, and heated to keep the internal temperature of the flask at 95° C.

To the flask, 20.0 ml of di-n-butyl ether and 3.1 ml of tri-n-octylamine were added. The resulting mixture in the flask was stirred at 95° C. for 30 minutes. Then, a solution obtained by dissolving 2.1 g of iodine in 41.7 ml of toluene was added thereto. The mixture in the flask was kept at 95° C. to undergo further reaction.

B-2. Washing:

After completion of the reaction, the reaction mixture was left standing at 25° C. and passed through a glass filter, G-3, having an available filter area of 3.0 cm$^2$ under an argon pressure of about 0.2 kg/cm$^2$. The solid product thus separated was washed twice with 40 ml of n-heptane with the aid of a glass filter, G-3. It was further washed twice with 40 ml of toluene and twice with 40 ml of n-heptane. The washings were invariably passed smoothly through the filter.

After the washing, the solid product was dried in vacuo to obtain a solid titanium trichloride catalyst. In the produced solid titanium trichloride catalyst, no discernible solid mass was found.

C. Polymerization of propylene:

When propylene was polymerized in the presence of the solid catalyst mentioned above by following the procedure of Step C of Example 1, the yield of the polymerization, PP/cat, was 1,340.

In the produced polypropylene powder thus obtained, solid masses having diameters exceeding 1,000μ were present in a total ratio of only 0.8 wt%.

COMPARATIVE EXAMPLE 2

In the preparation of a solid titanium trichloride catalyst according to Step B of Example 3, the reaction of a titanium trichloride composition was carried out by following the procedure of Sub-Step B-1. The resulting reaction mixture was left standing at 25° C. and then passed through a glass filter, G-3, having an available filter area of 3.0 cm$^2$ under an argon pressure of about 0.2 kg/cm$^2$.

The solid product thus separated was washed with 40 ml of toluene. When the resulting washings were passed through the filter under the same conditions as those involved in the filtration of the reaction mixture, the filtration proceeded at a very slow speed. Thus, the argon pressure was increased to about 0.5 kg/cm$^2$ for the purpose of expediting the filtration. As the result, complete filtration was barely obtained in about 6 minutes. The solid product was again washed with 40 ml of toluene. When an attempt was made to pass the resulting washings through the glass filter, virtually no filtration of the washings was obtained. As an alternative measure, the slurry was left standing until the solid catalyst settled and then subjected to solid-liquid separation under application of argon pressure with the aid of a stainless steel pipe 2 mm in inside diameter. The slurry was washed by being subjected to solid-liquid separation by the use of this stainless steel pipe once with 40 ml of toluene and twice with 40 ml of n-heptane and then dried in vacuo to obtain a solid titanium trichloride catalyst. In the produced solid titanium trichloride catalyst, a fairly large amount of solid masses were found.

When propylene was polymerized in the presence of the solid titanium trichloride catalyst obtained above by following the procedure of Step C of Example 1, the yield of the polymerization, PP/cat, was 1,400.

In the produced polypropylene powder, solid masses of polymer having diameters exceeding 1,000μ were present in a total ratio of 36.5 wt%. In these solid masses, those having particle diameters exceeding 3 mm accounted for a fairly large proportion.

EXAMPLE 4

A. Preparation of titanium trichloride composition:

A 200 ml four-neck flask provided with a stirrer and a dropping funnel was purged with argon, charged with 48 ml of n-heptane and 12 ml of titanium tetrachloride, and cooled to keep the solution inside at −10° C. With the internal temperature of the flask kept in a range of from −5° to −10° C., a solution consisting of 61 ml of n-heptane and 25 ml of ethyl aluminum sesquichloride was gradually added dropwise to the flask through the dropping funnel over a period of 3 hours.

After completion of the dropwise addition, the resulting reaction mixture was heated to 25° C. over a period of 30 minutes. The resulting mixture was stirred at 25° C. for 30 minutes. Then, the mixture was heated to 75° C. over a period of 30 minutes and then stirred for an additional 1 hour. The reaction mixture was left standing at 25° C. and passed through a glass filter, G-3, for solid-liquid separation. The solid product thus obtained was washed 4 times with 100 ml of n-heptane and then dried in vacuo to obtain a titanium trichloride composition.

B. Production of solid titanium trichloride catalyst:

B-1. Reaction of titanium trichloride composition:

A 200 ml flask provided with a stirrer was purged with argon, charged with 19.1 g of the aforementioned titanium trichloride composition and 51 ml of toluene, and heated to keep the internal temperature of the flask at 70° C.

Then, a solution obtained by dissolving 2.2 g of iodine in 44 ml of toluene, 19 ml of di-n-butyl ether, and 2.8 ml of dimethyl polysiloxane (product of Shinetsu Chemical Co., Ltd., having a viscosity of 100 c.s.) were added to the flask in that order. The resulting mixture in the flask was heated to 100° C. for 1 hour to undergo reaction.

B-2. Washing:

After completion of the reaction, the reaction mixture was passed through a glass filter, G-3, having an available filter area of 3.0 cm$^2$, under an argon pressure of about 0.2 kg/cm$^2$.

Then, the solid product thus obtained was washed with 38 ml of n-heptane and the resulting washings were filtered under the same conditions as those involved in the filtration of the reaction mixture. They were completely filtered in about 1 minute. This treatment was repeated 4 times. The solid product was dried in vacuo to obtain a solid titanium trichloride catalyst. In the produced solid titanium trichloride catalyst, no discernible solid mass was found.

C. Polymerization of propylene:

When propylene was polymerized in the presence of the solid titanium trichloride catalyst obtained as above by following the procedure of Step C of Example 1, the yield of the polymerization, PP/cat, was 1,370.

In the produced polypropylene powder, solid masses of polymer having diameters exceeding 1,000μ were present in a total ratio of only 0.2 wt%.

While the invention has been described in detail and with reference to specific embodiments thereof, it will be apparent to one skilled in the art that various changes and modifications can be made therein without departing from the spirit and scope thereof.

What is claimed is:

1. A method for the production of a solid titanium trichloride catalyst by the steps of (1) preparing a titanium trichloride composition comprising a solid reduction product obtained by reducing titanium tetrachloride with an organoaluminum compound represented by the formula, $R^1{}_nAlY_{3-n}$ (wherein $R^1$ is a hydrocarbon group having 1 to 18 carbon atoms; Y is a halogen atom or a hydrogen atom; and n is a number satisfying the equation, $1 < n \leq 3$), or a solid product obtained by thermally treating said solid reduction product at a temperature of not more than 150° C.; (2) reacting said titanium trichloride composition comprising said solid reduction product obtained in step (1) in an aromatic hydrocarbon solvent with a mixture consisting of a halogen compound represented by the formula, $X_2$ (wherein X is Cl, Br, or I), or an interhalogen compound represented by the formula, $XX'_a$ (wherein X and X' are each Cl, Br, or I, and a is 1 or 3), and an ether compound represented by the formula, $R^2$—O—$R^3$ (wherein $R^2$ and $R^3$, which may be the same or different, are each an alkyl group having 1 to 10 carbon atoms); (3) subjecting the resulting reaction mixture to solid-liquid separation; and (4) washing the resulting solid product with an inert hydrocarbon solvent, which method is characterized by using an aliphatic hydrocarbon as a washing medium during at least the first of washing treatments performed subsequently to said solid-liquid separation of said reaction mixture.

2. A method according to claim 1, wherein the amount of said washing medium used in one washing treatment is in the range of from 1.5 to 50 ml per gram of said solid titanium trichloride catalyst.

3. A method according to claim 1, wherein the washing temperature is in the range of 0° to 70° C.

4. A method according to claim 1, wherein said aliphatic hydrocarbon used in the first washing treatment is n-hexane or n-heptane.

5. A method according to claim 1, wherein said halogen compound represented by the formula, $X_2$, is iodine.

6. A method according to claim 1, wherein said either compound represented by the formula, $R^2$—O—$R^3$, is di-n-butyl ether or diisoamyl ether.

7. A method according to claim 1, wherein the amount of said halogen or interhalogen compound used is in the range of from $10^{-5}$ to $5 \times 10^{-2}$ mol per gram of said titanium trichloride composition.

8. A method according to claim 1, wherein the amount of said ether compound used is in the range of from $10^{-4}$ to 0.03 mol per gram of said titanium trichloride composition.

9. A method according to claim 1, wherein the reaction temperature of said titanium trichloride composition with said halogen or interhalogen compound is in the range of from 20° to 150° C.

10. A method according to claim 1, wherein said organoaluminum compound represented by the formula, $R^1{}_nAlY_{3-n}$, is ethyl aluminum sesquichloride or diethyl aluminum chloride.

* * * * *